US012744891B2

(12) United States Patent
Unno et al.

(10) Patent No.: US 12,744,891 B2
(45) **Date of Patent: *Sep. 22, 2026**

(54) IMAGE DECODING DEVICE, IMAGE DECODING METHOD, AND PROGRAM

(71) Applicant: KDDI CORPORATION, Tokyo (JP)

(72) Inventors: Kyohei Unno, Fujimino (JP); Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 19/021,772

(22) Filed: Jan. 15, 2025

(65) Prior Publication Data

US 2025/0159137 A1 May 15, 2025

Related U.S. Application Data

(63) Continuation of application No. 18/903,761, filed on Oct. 1, 2024, now Pat. No. 12,634,443, which is a (Continued)

(30) Foreign Application Priority Data

Mar. 11, 2019 (JP) ................................ 2019-043966

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/521* (2014.11)

(58) Field of Classification Search
CPC .. H04N 19/105; H04N 19/537; H04N 19/577; H04N 19/513; H04N 19/139; H04N 19/521; H04N 19/52
See application file for complete search history.

(56) References Cited

U.S. PATENT DOCUMENTS 9,681,150 B2 6/2017 Garud et al.
10,798,385 B2 * 10/2020 Lee .................... H04N 19/139
(Continued)

FOREIGN PATENT DOCUMENTS

WO 2020/184487 A1 9/2020

OTHER PUBLICATIONS

Bi-Directional Optical flow for Improving Motion Compensation; Alshin—2010. (Year: 2010).*
(Continued)

*Primary Examiner* — Luis Perez-Fuentes
(74) *Attorney, Agent, or Firm* — Troutman Pepper Locke LLP

(57) ABSTRACT

An image decoding device includes: a motion vector decoding unit that decodes a motion vector from encoded data; a refinement unit that performs refinement processing to correct the decoded motion vector; and a predictive signal generation unit that generates a predictive signal on the basis of the corrected motion vector outputted from the refinement unit. The predictive signal generation unit determines whether or not to apply BDOF processing for each block, on the basis of information calculated in the course of the refinement processing.

3 Claims, 10 Drawing Sheets

Related U.S. Application Data continuation of application No. 18/180,041, filed on Mar. 7, 2023, now Pat. No. 12,137,210, which is a continuation of application No. 17/437,991, filed as application No. PCT/JP2020/009245 on Mar. 4, 2020, now Pat. No. 11,627,311.

(51) Int. Cl.
*H04N 19/176* (2014.01)
*H04N 19/513* (2014.01)

(56) References Cited

U.S. PATENT DOCUMENTS

| | | | | |
|---|---|---|---|---|
| 10,931,969 | B2 * | 2/2021 | Chen | H04N 19/537 |
| 10,977,809 | B2 | 4/2021 | Choudhury et al. | |
| 11,172,216 | B1 | 11/2021 | Zhang et al. | |
| 11,178,422 | B2 | 11/2021 | Liu et al. | |
| 11,297,344 | B2 | 4/2022 | Lim et al. | |
| 11,490,096 | B2 | 11/2022 | Sethuraman et al. | |
| 11,627,311 | B2 * | 4/2023 | Unno | H04N 19/105 375/240.02 |
| 11,889,099 | B2 * | 1/2024 | Chen | H04N 19/159 |
| 12,137,210 | B2 * | 11/2024 | Unno | H04N 19/105 |
| 2016/0345011 | A1 | 11/2016 | Naing et al. | |
| 2018/0192072 | A1 | 7/2018 | Chen et al. | |
| 2020/0221122 | A1 | 7/2020 | Ye et al. | |
| 2021/0029378 | A1 | 1/2021 | He et al. | |
| 2021/0266595 | A1 | 8/2021 | Su et al. | |
| 2021/0329257 | A1 | 10/2021 | Sethuraman et al. | |

OTHER PUBLICATIONS

Bi-directional Optical Flow for Inter-layer Texture Prediction; Alshin et al.—2013. (Year: 2013).*

Complexity reduction and bit-width control for bi-directional optical flow; Oct. 2018. (Year: 2018).*

Co-existing analysis for DMVR with BDOF; Jan. 2019. (Year: 2019).*

International Search Report issued in corresponding International Patent Application No. PCT/JP2020/009245 dated May 26, 2020.

Sethuraman, S., et al. "Non-CE9: Co-existence analysis for DMVR with BDOF" Joint Video Experts Team (JVET) of ITU-T SG 16 WP 3 and ISO.IEC JTC 1/SC 29/WG 11, JVET-M0223-v4, 6 pages (Jan. 2019).

Xiu, X., et al., "CE-9-related: Complexity reduction and bit-width control for bi-directional optical flow (BIO)" Joint Video Experts Team (JVET) of ITU-T SG 16 WP 3 and ISO.IEC JTC 1/SC 29/WG 11, JVET-L0256-v2, 16 pages (Oct. 2018).

Kondo, K., et al., "Non-CE9: On early termination for BDOF" Joint Video Experts Team (JVET) of ITU-T SG 16 WP 3 and ISO.IEC JTC 1/SC 29/WG 11, JVET-M0073-r2, 6 pages (Jan. 2019).

Chujoh, T., et al., "CE9-related: Early termination for BDOF" Joint Video Experts Team (JVET) of ITU-T SG 16 WP 3 and ISO.IEC JTC 1/SC 29/WG 11, JVET-N0148-v3, 7 pages (Mar. 2019).

Unno, K., et al., "CE9-related: Alternative method of SAD based early termination for BDOF" Joint Video Experts Team (JVET) of ITU-T SG 16 WP 3 and ISO.IEC JTC 1/SC 29/WG 11, JVET-N0158-v2, 5 pages (Mar. 2019).

Bross, B., et al., "Versatile Video Coding (Draft 4)" Joint Video Experts Team (JVET) of ITU-T SG 16 WP 3 and ISO.IEC JTC 1/SC 29/WG 11, JVET-M1001-v6, 299 pages (Jan. 2019): Chapter 8.4. 5.3 Decoding process for palette mode; Chapter 8.5.1 General decoding process for coding units coded in inter prediction mode; Chapter 8.5.3 Decoder side motion vector refinement process; Chapter 8.5.6.1 General.

Chen, H., et al., "CE9-related: BDOF buffer reduction and enabling VPDU based application" Joint Video Experts Team (JVET) of ITU-T SG 16 WP 3 and ISO.IEC JTC 1/SC 29/WG 11, JVET-M0890-v2, 3 pages (Jan. 2019).

Extended European Search Report dated Dec. 8, 2022, from corresponding EP Application No. 20768908.4.

Luo Al: "CE2-related: Simplified symmetric MVD based on CE4. 4.3", 13th JVET Meeting Marrakech; Jan. 9-18, 2019; (The Joint Video Experts Team (JVET) of ITU-T SG 16 WP 3 and ISO/IEC JTC1/SC29/WG11), No. JVET-M0444.

Notice of Allowance issued in corresponding U.S. Appl. No. 18/903,761, dated Jan. 28, 2026.

* cited by examiner

Figure 3:
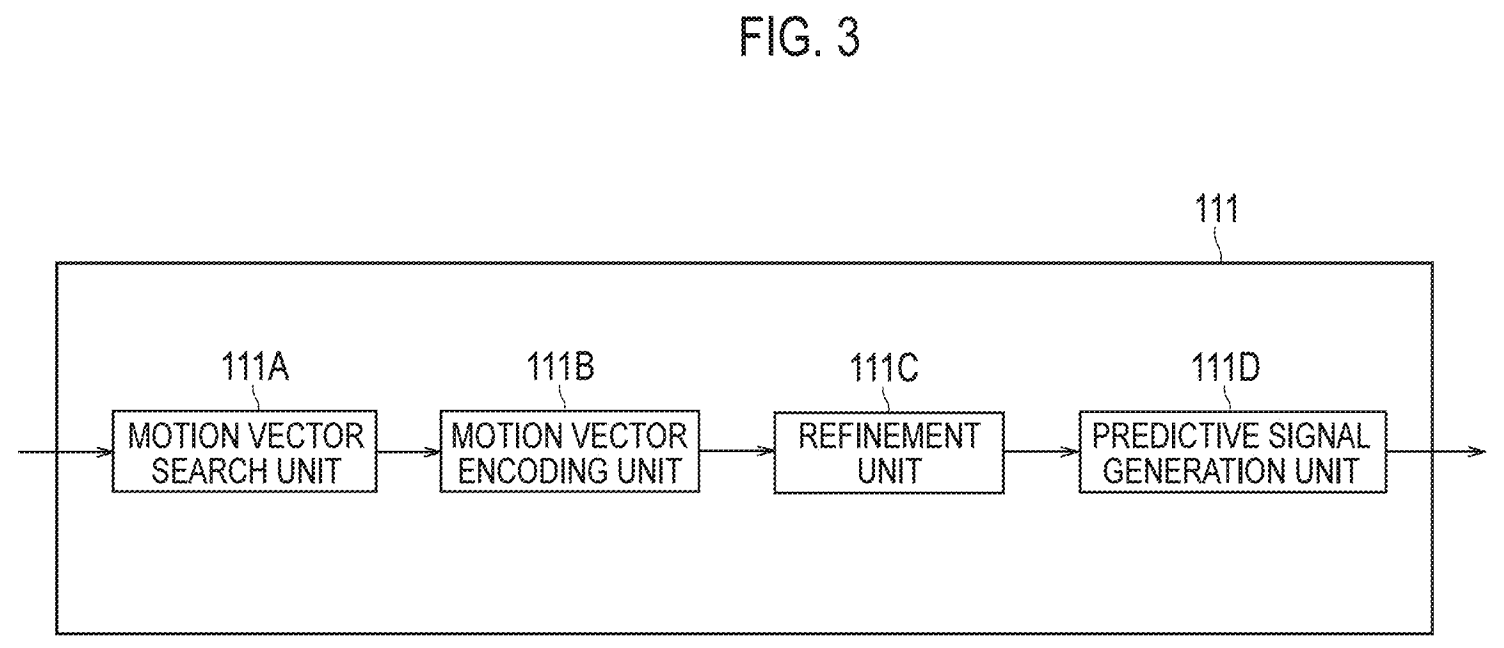

111A MOTION VECTOR SEARCH UNIT

111B MOTION VECTOR ENCODING UNIT

111C REFINEMENT UNIT

111D PREDICTIVE SIGNAL GENERATION UNIT

Figure 6:
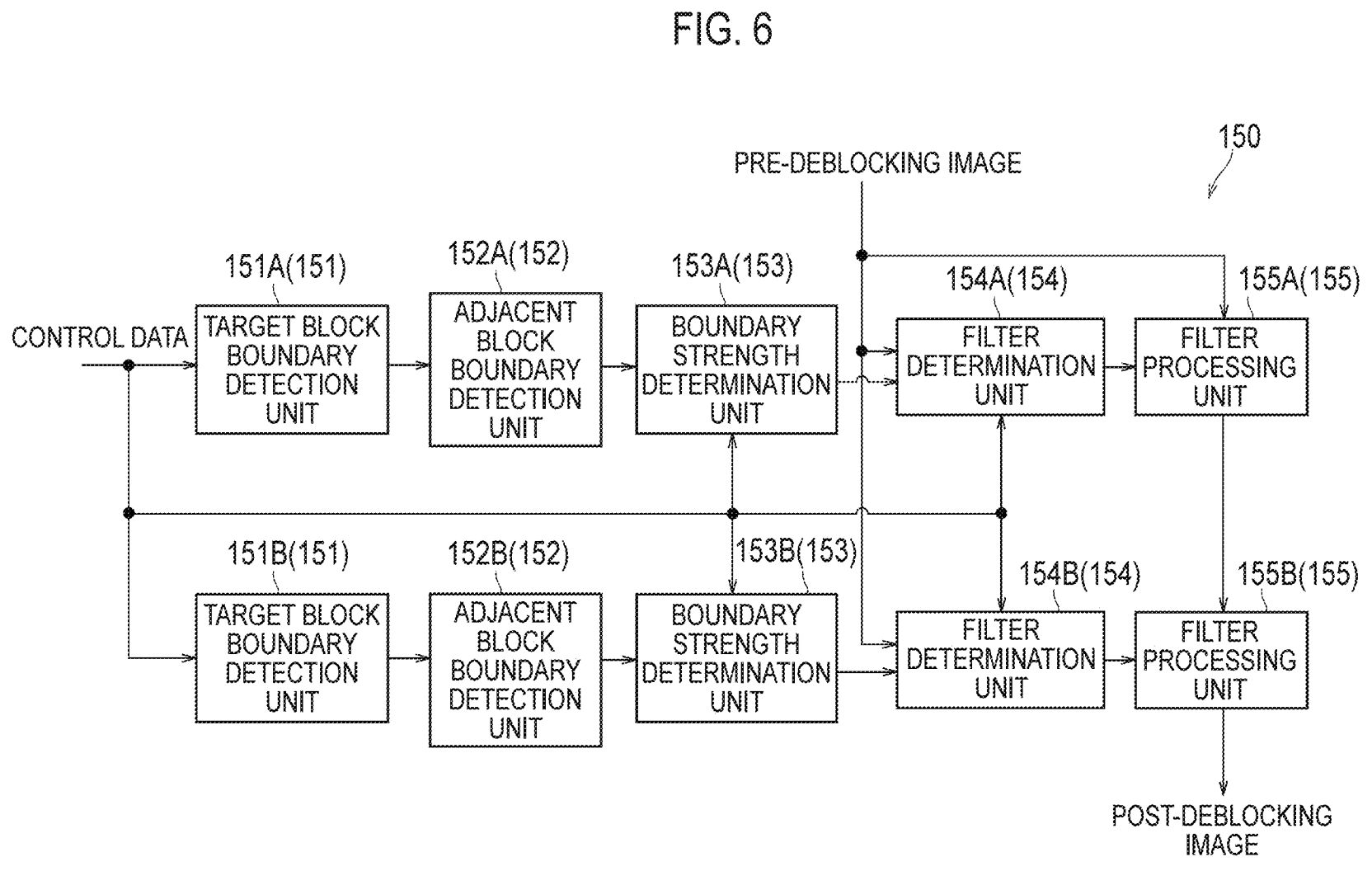

PRE-DEBLOCKING IMAGE

CONTROL DATA

151A(151) TARGET BLOCK BOUNDARY DETECTION UNIT

152A(152) ADJACENT BLOCK BOUNDARY DETECTION UNIT

153A(153) BOUNDARY STRENGTH DETERMINATION UNIT

154A(154) FILTER DETERMINATION UNIT

155A(155) FILTER PROCESSING UNIT

151B(151) TARGET BLOCK BOUNDARY DETECTION UNIT

152B(152) ADJACENT BLOCK BOUNDARY DETECTION UNIT

153B(153) BOUNDARY STRENGTH DETERMINATION UNIT

154B(154) FILTER DETERMINATION UNIT

155B(155) FILTER PROCESSING UNIT

POST-DEBLOCKING IMAGE

FIG. 7

| CONDITION | BOUNDARY STRENGTH |
| --- | --- |
| AT LEAST EITHER OF BLOCKS ON BOTH SIDES OF BLOCK BOUNDARY IS INTRA-PREDICTIVE BLOCK | 2 |
| NON-ZERO TRANSFORM COEFFICIENT IS PRESENT IN AT LEAST EITHER OF BLOCKS ON BOTH SIDES OF BLOCK BOUNDARY, TU BOUNDARY | 1 |
| ABSOLUTE VALUE OF DIFFERENCE IN MOTION VECTORS OF BLOCKS ON BOTH SIDES OF BLOCK BOUNDARY IS GREATER THAN OR EQUAL TO 1 PIXEL | 1 |
| REFERENCE IMAGE IS DIFFERENT IN BLOCKS ON BOTH SIDES OF BLOCK BOUNDARY, OR NUMBERS OF MOTION VECTORS ARE DIFFERENT | 1 |
| DMVR IS APPLIED IN AT LEAST EITHER OF BLOCKS ON BOTH SIDES OF BLOCK BOUNDARY | 1 |
| OTHER CONDITION | 0 |

ENCODED DATA
210
DECODING UNIT
220
INVERSE TRANSFORMATION/ INVERSE QUANTIZATION UNIT
230
OUTPUT IMAGE SIGNAL
260
FRAME BUFFER
241
INTER-PREDICTION UNIT
242
INTRA-PREDICTION UNIT
250
IN-LOOP FILTER PROCESSING UNIT

Figure 10:
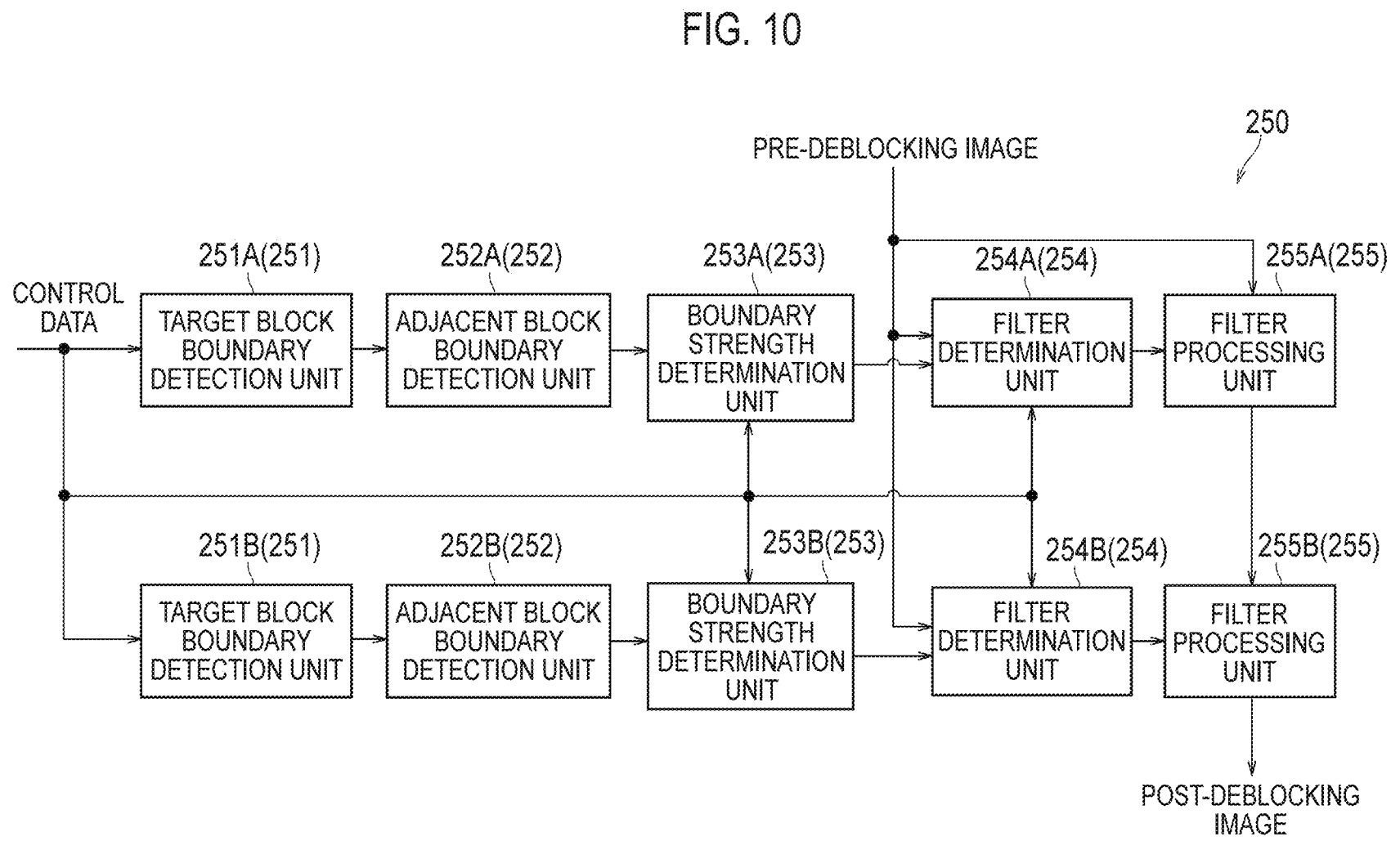

PRE-DEBLOCKING IMAGE

CONTROL DATA

251A(251) TARGET BLOCK BOUNDARY DETECTION UNIT

252A(252) ADJACENT BLOCK BOUNDARY DETECTION UNIT

253A(253) BOUNDARY STRENGTH DETERMINATION UNIT

254A(254) FILTER DETERMINATION UNIT

255A(255) FILTER PROCESSING UNIT

251B(251) TARGET BLOCK BOUNDARY DETECTION UNIT

252B(252) ADJACENT BLOCK BOUNDARY DETECTION UNIT

253B(253) BOUNDARY STRENGTH DETERMINATION UNIT

254B(254) FILTER DETERMINATION UNIT

255B(255) FILTER PROCESSING UNIT

POST-DEBLOCKING IMAGE

IMAGE DECODING DEVICE, IMAGE DECODING METHOD, AND PROGRAM

CROSS REFERENCE TO RELATED APPLICATIONS

The present application is a continuation of U.S. application Ser. No. 18/903,761 filed Oct. 1, 2024, which is a continuation of U.S. application Ser. No. 18/180,041 filed Mar. 7, 2023, now U.S. Pat. No. 12,137,210, which is a continuation of U.S. application Ser. No. 17/437,991 filed Sep. 10, 2021, now U.S. Pat. No. 11,627,311, which is a U.S. National Phase Application under 35 U.S.C. § 371 of International Patent Application No. PCT/JP2020/009245 filed Mar. 4, 2020, which claims priority of Japanese Patent Application No. 2019-043966 filed Mar. 11, 2019. The entire contents of the above are hereby incorporated by reference.

TECHNICAL FIELD

The present invention relates to an image decoding device, an image processing method, and a program.

BACKGROUND

Conventionally, with regard to techniques such as BDOF (Bi-Directional Optical Flow), a technique is disclosed in which, in order to shorten the software execution time, the sum of absolute differences of pixel values between two reference images used in BDOF processing is calculated, and when the sum of absolute differences is smaller than a predetermined threshold value, BDOF processing of the relevant blocks is skipped (see, for example, Versatile Video Coding (Draft 4), JVET-M1001).

On the other hand, from the standpoint of reducing the processing delay upon hardware implementation, a technique for removing the BDOF skipping processing by calculating the foregoing sum of absolute differences has also been disclosed (see, for example, CE9-related: BDOF buffer reduction and enabling VPDU based application, JVET-M0890).

SUMMARY OF INVENTION

However, the technique disclosed in Versatile Video Coding (Draft 4), JVET-M1001, for example, makes it possible to shorten the execution time when this technique is implemented using software. However, there is the problem that the execution time increases in the case of hardware-based implementation.

On the other hand, the technique disclosed in CE9-related: BDOF buffer reduction and enabling VPDU based application, JVET-M0890 makes it possible to shorten the execution time using hardware. However, there is the problem that the execution time increases when using software.

Therefore, the foregoing prior art is confronted with the problem of not enabling a shortening of the processing time during both software implementation and hardware implementation.

Therefore, the present invention was conceived in view of the foregoing problem, and an object of the present invention is to provide an image decoding device, an image decoding method, and a program which make it possible to control the suitability of BDOF processing by using information calculated in the course of refinement processing prior to BDOF processing, thereby reducing the amount of processing from the standpoint of hardware implementation by diverting values that have already been calculated, and shortening the processing time from the viewpoint of software implementation by reducing the number of blocks to which BDOF processing is applied.

The first aspect of the present invention is summarized as an image decoding device, including: a motion vector decoding unit that decodes a motion vector from encoded data; a refinement unit that performs refinement processing to correct the decoded motion vector; and a predictive signal generation unit that generates a predictive signal on the basis of the corrected motion vector outputted from the refinement unit, wherein the predictive signal generation unit determines whether or not to apply BDOF processing for each block, on the basis of information calculated in the course of the refinement processing.

The second aspect of the present invention is summarized as an image decoding device, including: a motion vector decoding unit that decodes a motion vector from encoded data; a refinement unit that performs refinement processing to correct the decoded motion vector; and a predictive signal generation unit that generates a predictive signal on the basis of the corrected motion vector outputted from the refinement unit, wherein the predictive signal generation unit applies BDOF processing when an application condition is satisfied, and the application condition is that the motion vector is encoded in symmetric MVD mode, and the magnitude of the differential motion vector transmitted in the symmetric MVD mode is less than or equal to a preset threshold value.

The third aspect of the present invention is summarized as an image decoding method, including the steps of: (A) decoding a motion vector from encoded data; (B) performing refinement processing to correct the decoded motion vector; and (C) generating a predictive signal on the basis of the corrected motion vector outputted from the refinement unit, wherein it is determined in the step (C), for each block, whether or not to apply BDOF processing, on the basis of information calculated in the course of the refinement processing.

The fourth aspect of the present invention is summarized as a program that is used in an image decoding device and that causes a computer to execute the steps of:

(A) decoding a motion vector from encoded data;

(B) performing refinement processing to correct the decoded motion vector; and (C) generating a predictive signal on the basis of the corrected motion vector outputted from the refinement unit, wherein it is determined in step (C), for each block, whether or not to apply BDOF processing, on the basis of information calculated in the course of the refinement processing.

According to the present invention, it is possible to provide an image decoding device, an image decoding method, and a program which make it possible to reduce the amount of processing relating the BDOF processing in both hardware implementation and software implementation.

BRIEF DESCRIPTION OF DRAWINGS

FIG. 3 is a diagram illustrating an example of function blocks of an inter-prediction unit 111 of the image encoding device 100 according to one embodiment.

FIG. 6 is a diagram illustrating an example of function blocks of an in-loop filter processing unit 150 of the image encoding device 100 according to one embodiment.

FIG. 7 is a diagram serving to illustrate an example of determination by a boundary strength determination unit 153 of the in-loop filter processing unit 150 of the image encoding device 100 according to one embodiment.

FIG. 10 is a diagram illustrating an example of function blocks of an in-loop filter processing unit 250 of the image decoding device 200 according to one embodiment.

DETAILED DESCRIPTION

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

Figure 1:
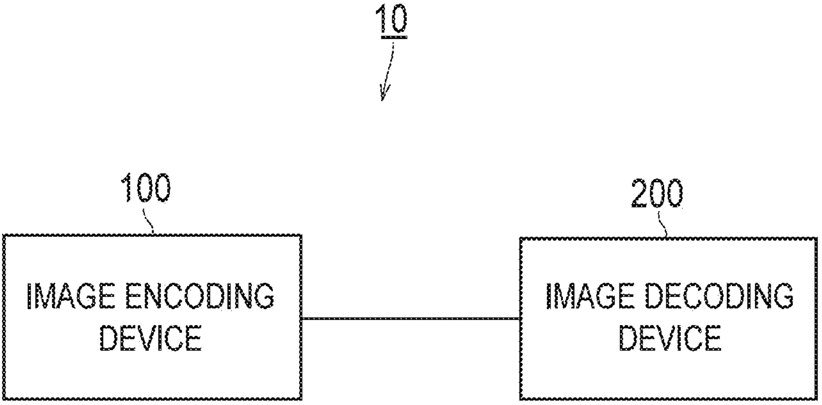
FIG. 1 is a diagram illustrating an example of a configuration of an image processing system 10 according to one embodiment.

A image processing system 10 according to a first embodiment of the present invention will be described hereinbelow with reference to FIGS. 1 to 10. FIG. 1 is a diagram illustrating the image processing system 10 according to an embodiment pertaining to the present embodiment.

As illustrated in FIG. 1, the image processing system 10 has an image encoding device 100 and an image decoding device 200.

The image encoding device 100 is configured to generate encoded data by encoding an input image signal. The image decoding device 200 is configured to generate an output image signal by decoding the encoded data.

Here, such encoded data may be transmitted from the image encoding device 100 to the image decoding device 200 via a transmission channel. The encoded data may also be stored on a storage medium and then provided to the image decoding device 200 from the image encoding device 100.

Figure 2:
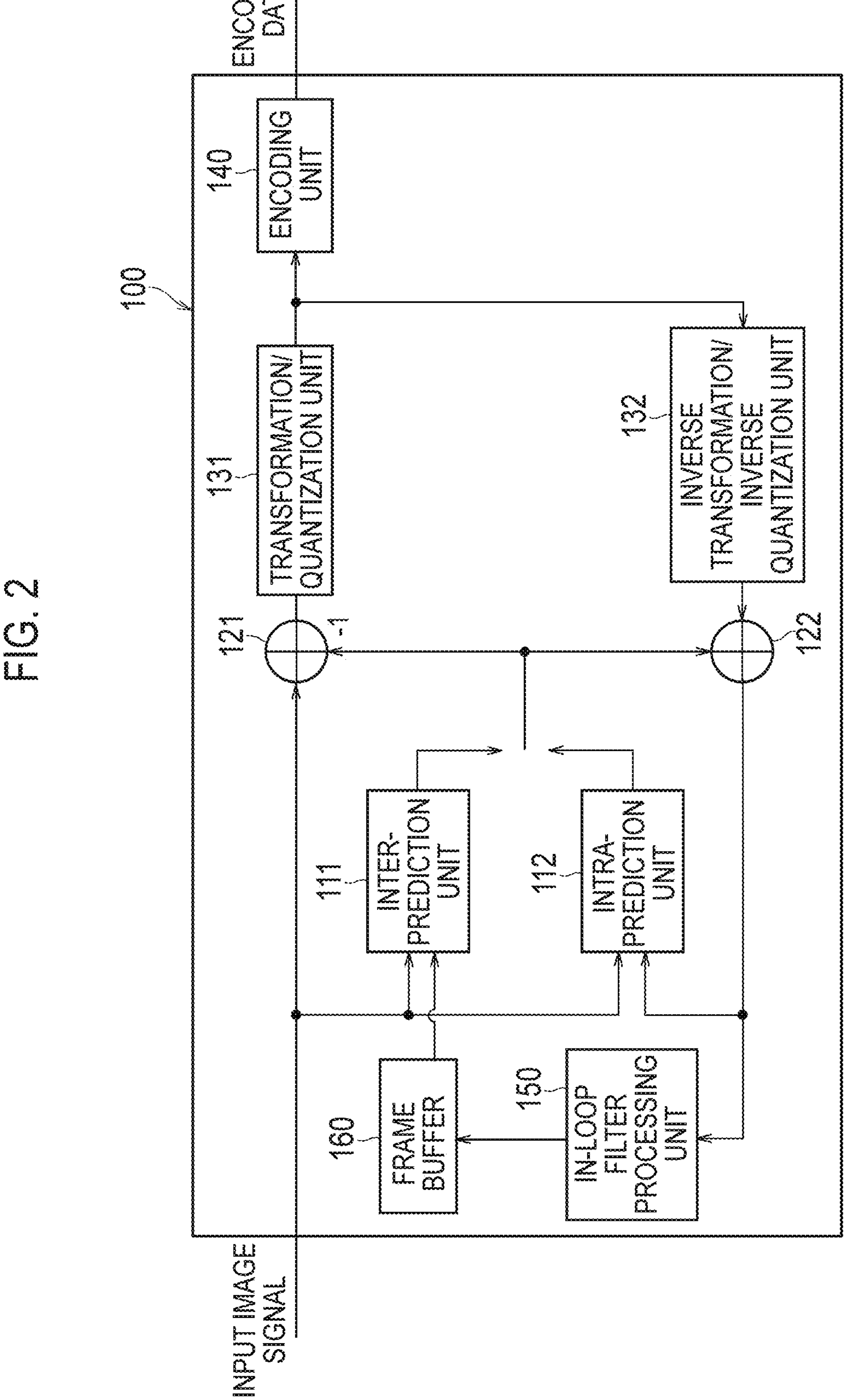
FIG. 2 is a diagram illustrating an example of function blocks of an image encoding device 100 according to one embodiment.

The image encoding device 100 according to the present embodiment is described hereinbelow with reference to FIG. 2. FIG. 2 is a diagram illustrating an example of function blocks of the image encoding device 100 according to the present embodiment.

As illustrated in FIG. 2, the image encoding device 100 includes an inter-prediction unit 111; an intra-prediction unit 112; a subtractor 121; an adder 122; a transformation/quantization unit 131; an inverse transformation/inverse quantization unit 132; an encoding unit 140; an in-loop filter processing unit 150; and a frame buffer 160.

The inter-prediction unit 111 is configured to generate a predictive signal by means of inter-prediction (inter-frame prediction).

More specifically, the inter-prediction unit 111 is configured to specify a reference block contained in a reference frame by comparing a target frame to be encoded (hereinafter referred to as the target frame) with a reference frame stored in the frame buffer 160, and to determine a motion vector with respect to the specified reference block.

Furthermore, the inter-prediction unit 111 is configured to generate, for each predictive block, a predictive signal that is contained in the predictive block, on the basis of a reference block and a motion vector. The inter-prediction unit 111 is configured to output predictive signals to the subtractor 121 and the adder 122. Here, the reference frame is a frame that differs from the target frame.

The intra-prediction unit 112 is configured to generate a predictive signal by means of intra-prediction (prediction within a frame).

More specifically, the intra-prediction unit 112 is configured to specify a reference block that is contained in a target frame and to generate, on the basis of the specified reference block, a predictive signal for each predictive block. Further, the intra-prediction unit 112 is configured to output predictive signals to the subtractor 121 and the adder 122.

Here, the reference block is the block that is referenced for the block to be predicted (hereinafter referred to as the target block). For example, the reference block is the block adjacent to the target block.

The subtractor 121 is configured to subtract the predictive signal from the input image signal and output the predictive residual signal to the transformation/quantization unit 131. Here, the subtractor 121 is configured to generate a predictive residual signal, which is the difference between the predictive signal generated using intra-prediction or inter-prediction, and the input image signal.

The adder 122 is configured to generate a pre-filtering decoding signal by adding the predictive signal to the predictive residual signal which is outputted from the inverse transformation/inverse quantization unit 132, and to output this pre-filtering decoding signal to the intra-prediction unit 112 and the in-loop filter processing unit 150.

Here, the pre-filtering decoding signal constitutes the reference block used by the intra-prediction unit 112.

The transformation/quantization unit 131 is configured to perform transformation processing of the predictive residual signal and to acquire coefficient level values. In addition, the transformation/quantization unit 131 may be configured to perform quantization of the coefficient level values.

Here, the transformation processing is processing for transforming the predictive residual signal into a frequency component signal. In such transformation processing, the basis pattern (transformation matrix) corresponding to the Discrete Cosine Transform (DCT) may be used, or the basis pattern (transformation matrix) corresponding to the Discrete Sine Transform (DST) may be used.

The inverse transformation/inverse quantization unit 132 is configured to perform inverse transformation processing of the coefficient level value outputted from the transformation/quantization unit 131. Here, the inverse transformation/inverse quantization unit 132 may also be configured to perform inverse quantization of the coefficient level values prior to inverse transformation processing.

Here, the inverse transformation processing and inverse quantization are performed using steps which are the inverse of the transformation processing and quantization performed by the transformation/quantization unit 131.

The encoding unit 140 is configured to encode the coefficient level values outputted from the transformation/quantization unit 131 and to output the encoded data.

Here, for example, the encoding is entropy encoding that assigns codes of different lengths on the basis of the probability of the coefficient level values being generated.

Furthermore, the encoding unit 140 is configured to encode, in addition to coefficient level values, control data which is used in decoding processing.

Here, the control data may include size data such as the encoded block (CU: Coding Unit) size, the predictive block (PU: Prediction Unit) size, and the transformation block (TU: Transform Unit) size.

The in-loop filter processing unit 150 is configured to perform filter processing on a pre-filtering decoding signal which is outputted from the adder 122 and to output a post-filtering decoding signal to the frame buffer 160.

Here, for example, the filter processing is deblocking filter processing that reduces distortions that occur at the boundaries of blocks (encoded blocks, predictive blocks, or transformation blocks).

The frame buffer 160 is configured to store reference frames that are used in the inter-prediction unit 111.

Here, the post-filtering decoding signal constitutes the reference frame used by the inter-prediction unit 111.

The inter-prediction unit 111 of the image encoding device 100 according to the present embodiment is described hereinbelow with reference to FIG. 3. FIG. 3 is a diagram illustrating an example of function blocks of the inter-prediction unit 111 of the image encoding device 100 according to the present embodiment.

As illustrated in FIG. 3, the inter-prediction unit 111 has a motion vector search unit 111A, a motion vector encoding unit 111B, a refinement unit 111C, and a predictive signal generation unit 111D.

The inter-prediction unit 111 is an example of a prediction unit that is configured to generate, on the basis of a motion vector, a predictive signal which is contained in a predictive block.

More specifically, the motion vector search unit 111A is configured to specify a reference block which is contained in a reference frame by means of a comparison between a target frame and the reference frame, and to search for a motion vector for the specified reference block.

Furthermore, the foregoing search processing is performed for a plurality of reference frame candidates to determine the reference frame and motion vector to be used in the prediction of the relevant predictive block. A maximum of two reference frames and two motion vectors can be used for a single block. A case where only one set of a reference frame and a motion vector is used for a single block is called uni-prediction, and a case where two sets of a reference frame and a motion vector are used is called bi-prediction. Hereinafter, the first set will be referred to as L0 and the second set as L1.

Furthermore, the motion vector search unit 111A is configured to determine the method for encoding the reference frame and the motion vector. In addition to the normal method for transmitting information about the reference frame and the motion vector respectively, there are other encoding methods such as the merge mode (described subsequently) and the symmetric MVD mode disclosed in CE9-related: BDOF buffer reduction and enabling VPDU based application, JVET-M0890.

Note that the details of the method for searching for a motion vector, the method for determining the reference frame, and the method for determining the method for encoding the reference frame and the motion vector are omitted because known methods can be adopted.

The motion vector encoding unit 111B is configured to encode the information about the reference frame and motion vector determined by the motion vector search unit 111A by using the encoding method similarly determined by the motion vector search unit 111A.

When the encoding method for the block is merge mode, a merge list for the block is first created. The merge list is a list of a plurality of enumerated combinations of reference frames and motion vectors. Each combination is assigned an index, and instead of encoding the information about the reference frame and the motion vector separately, only the index is encoded and transmitted to the decoding side. By standardizing the method for creating the merge list between the encoding and decoding sides, the decoding side is capable of decoding the information about the reference frame and the motion vector only from the index information. Since it is possible to employ a known technique as the method for creating the merge list, the details are omitted.

Symmetric MVD mode is an encoding method that can only be used when bi-prediction is performed on the relevant block. In symmetric MVD mode, among the two (L0, L1) reference frames and two (L0, L1) motion vectors, which are the information to be transmitted to the decoding side, only the L0 motion vector (the differential motion vector) is encoded. Information about the remaining L1 motion vector and the two reference frames is uniquely determined on the encoding side and the decoding side, respectively, using a predetermined method.

For the encoding of the motion vector information, a predictive motion vector, which is the predicted value of the motion vector to be encoded, is first generated, and then the differential motion vector, which is the difference between the predictive motion vector and the motion vector which is actually to be encoded, is encoded.

In symmetric MVD mode, a vector obtained by inverting the code of the encoded L0 differential motion vector is used as the L1 differential motion vector. With regard to a specific method, the method disclosed in CE9-related: BDOF buffer reduction and enabling VPDU based application, JVET-M0890 can be used, for example.

The refinement unit 111C is configured to perform refinement processing (DMVR, for example) to correct the motion vectors encoded by the motion vector encoding unit 111B.

Specifically, the refinement unit 111C is configured to set a search range based on the reference position specified by the motion vector encoded by the motion vector encoding unit 111B, specify a corrected reference position with the lowest predetermined cost among the search ranges, and perform refinement processing to correct the motion vector on the basis of the corrected reference position.

Figure 4:
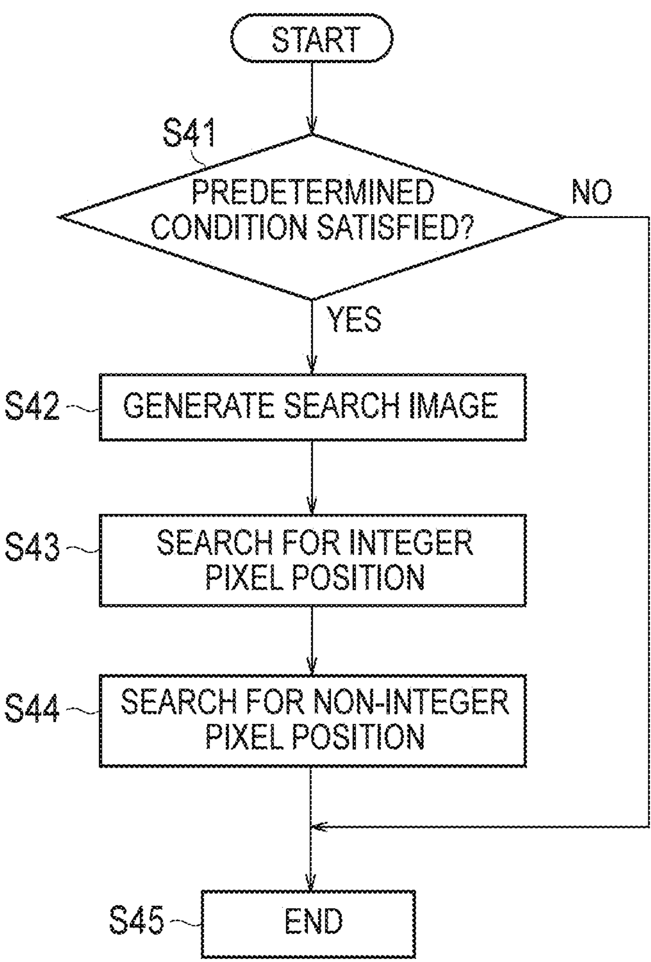
FIG. 4 is a flowchart illustrating an example of a processing procedure of a refinement unit 111C of the inter-prediction unit 111 of the moving image decoding device 30 according to one embodiment.

FIG. 4 is a flowchart illustrating an example of the processing procedure of the refinement unit 111C.

As illustrated in FIG. 4, in step S41, the refinement unit 111C determines whether or not the predetermined conditions for applying the refinement processing are satisfied. When all the predetermined conditions are satisfied, this processing procedure advances to step S42. When any one of the predetermined conditions is not satisfied, this processing procedure advances to step S45 and ends the refinement processing.

Here, the predetermined conditions include the condition that the relevant block is a block for performing bi-prediction.

Furthermore, the predetermined conditions may also include the condition that the motion vectors are encoded in merge mode.

The predetermined conditions may also include the condition that the motion vectors are encoded in symmetric MVD mode.

Furthermore, the predetermined conditions may also include the conditions that the motion vectors are encoded in symmetric MVD mode and that the magnitude of the differential motion vector (L0 MVD) transmitted in symmetric MVD mode is less than or equal to a preset threshold value.

Here, the magnitude of the differential motion vector can be defined, for example, by the absolute values of the horizontal and vertical components of the differential motion vector, respectively.

The threshold values used may be different for each of the horizontal and vertical components of the motion vectors, or a common threshold value may be used for the horizontal and vertical components. It is also possible to set the threshold value to 0. This would signify that, in this case, the predictive motion vector and the motion vector to be encoded are the same value. The threshold value may also be defined using minimum and maximum values. In this case, the predetermined conditions include the condition that the value or absolute value of the differential motion vector is greater than or equal to a predefined minimum value and less than or equal to a predefined maximum value.

The predetermined conditions may also include the condition that the motion vectors are encoded in merge mode or symmetric MVD mode. Similarly, the predetermined conditions may also include the conditions that the motion vectors are encoded in merge mode or symmetric MVD mode, and when encoded in symmetric MVD mode, that the magnitude of the transmitted differential motion vector is less than or equal to a preset threshold value.

In step S42, the refinement unit 111C generates a search image on the basis of information about the motion vector encoded by the motion vector encoding unit 111B and about the reference frame.

Here, when the motion vector points to a non-integer pixel position, the refinement unit 111C applies a filter to the pixel value of the reference frame to interpolate the pixel at the non-integer pixel position. At this time, the refinement unit 111C is capable of reducing the amount of computation by using an interpolation filter with a smaller number of taps than the interpolation filter used by the predictive signal generation unit 111D described subsequently. For example, the refinement unit 111C is capable of interpolating the pixel values at non-integer pixel positions through bilinear interpolation.

In step S43, the refinement unit 111C performs a search with integer pixel precision using the search image generated in step S42. Here, integer pixel precision means that only points with integer pixel intervals are searched for, based on the motion vectors encoded by the motion vector encoding unit 111B.

The refinement unit 111C determines the corrected motion vector at the integer pixel interval position through the search in step S42. it is possible to use a known technique as the search method. For example, the refinement unit 111C is also capable of performing a search using a method in which the search is performed only for a point representing a combination obtained by inverting only the code of the differential motion vectors on the L0 and L1 sides. Here, it is likely that the result of the search in step S43 will be the same value as the motion vector before the search.

In step S44, the refinement unit 111C performs a motion vector search using non-integer pixel precision by taking, as the initial value, the corrected motion vector obtained using integer pixel precision which was determined in step S43. it is possible to use a known technique as the motion vector search method.

The refinement unit 111C can also use the result of step S43 as an input to determine the vector with non-integer pixel precision by using a parametric model such as parabolic fitting without actually performing a search.

After determining the corrected motion vector with non-integer pixel precision in step S44, the refinement unit 111C moves to step S45 and ends the refinement processing. Here, for the sake of expediency, the expression "corrected motion vector with non-integer pixel precision," has been used; however, depending on the search result of step S44, it is likely that the result is the same value as the motion vector with integer pixel precision obtained in step S43.

The refinement unit 111C may also divide a block larger than a predefined threshold value into small subblocks and execute the refinement processing for each subblock. For example, the refinement unit 111C is capable of setting the unit of execution for the refinement processing to be 16×16 pixels, and when the horizontal or vertical size of the block is larger than 16 pixels, same can be divided so that the size is less than or equal to 16 pixels, respectively. At this time, the motion vector of the relevant block encoded by the motion vector encoding unit 111B for all subblocks in the same block is used as the motion vector which serves as a reference for the refinement processing.

When processing is performed for each subblock, the refinement unit 111C may also perform all the steps in FIG. 4 for each subblock. The refinement unit 111C may also process only a part of the processing in FIG. 4 for each subblock. More specifically, the refinement unit 111C may also perform block-by-block processing for steps S41 and S42 in FIG. 4, and subblock-by-subblock processing for steps S43 and S44 only.

The predictive signal generation unit 111D is configured to generate a predictive signal on the basis of the corrected motion vector outputted from the refinement unit 111C.

Here, as described below, the predictive signal generation unit 111D is configured to determine whether or not to perform BDOF processing for each block on the basis of the information (the search cost, for example) calculated in the course of the foregoing refinement processing.

More specifically, the predictive signal generation unit 111D is configured to generate a predictive signal on the basis of the motion vector encoded by the motion vector encoding unit 111B, when a motion vector is not corrected. On the other hand, the predictive signal generation unit 111D is configured to generate a predictive signal on the basis of the motion vector corrected by the refinement unit 111C, when the motion vector is corrected.

Figure 5:
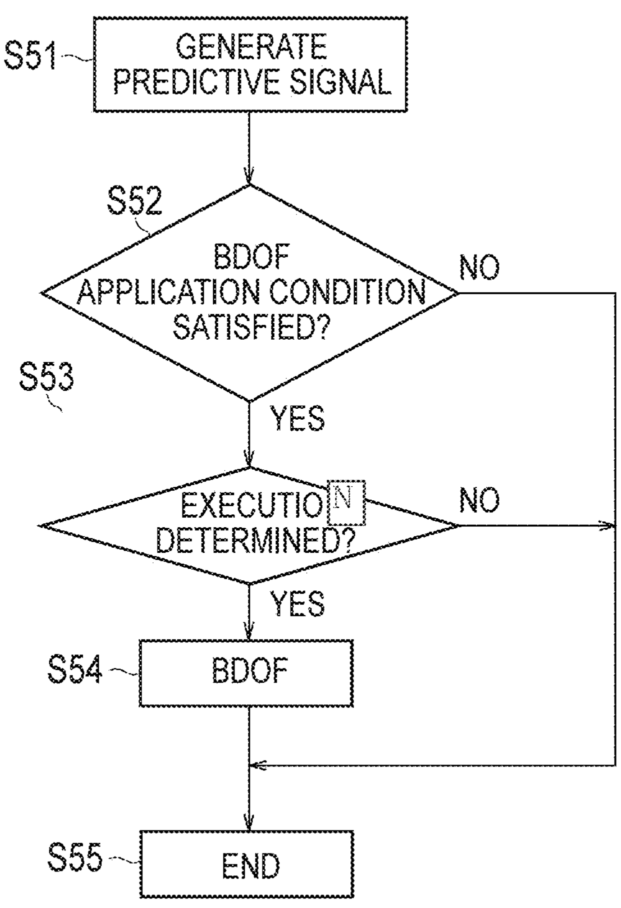
FIG. 5 is a flowchart illustrating an example of a processing procedure of a predictive signal generation unit 111D of the inter-prediction unit 111 of the moving image decoding device 30 according to one embodiment.

FIG. 5 is a flowchart illustrating an example of the processing procedure of the predictive signal generation unit 111D. Here, when the refinement processing is performed in subblock units in the refinement unit 111C, the processing by the predictive signal generation unit 111D is also executed in subblock units. In that case, the word "block" in the description hereinbelow can, where appropriate, be read as "subblock".

As illustrated in FIG. 5, the predictive signal generation unit 111D generates a predictive signal in step S51.

More specifically, the predictive signal generation unit 111D takes the motion vector encoded by the motion vector encoding unit 111B or the motion vector encoded by the refinement unit 111C as an input, and when the position the motion vector points to is a non-integer pixel position, the predictive signal generation unit 111D applies a filter to the pixel values of the reference frame to interpolate the pixels at the non-integer pixel position. Here, for the specific filter, the horizontally and vertically divisible filter with a maximum of 8 taps as disclosed in Non Patent Literature 2 can be applied.

When the block is a block for performing bi-prediction, both the predictive signal from the first (referred to as L0 hereafter) reference frame and motion vector, and the predictive signal from the second (referred to as L1 hereafter) reference frame and motion vector are generated.

In step S52, the predictive signal generation unit 111D checks whether or not the conditions for applying BDOF (Bi-Directional Optical Flow), described subsequently, are satisfied.

For such application conditions, the conditions disclosed in Non Patent Literature 2 can be applied. The application conditions include the condition that at least the relevant block is a block for performing bi-prediction. The application conditions may also include the condition that the motion vector of the relevant block is not encoded in symmetric MVD mode, as disclosed in Versatile Video Coding (Draft 4), JVET-M1001.

Furthermore, the application conditions may also include the conditions that the motion vector of the relevant block is not encoded in symmetric MVD mode, or that, when encoded in symmetric MVD mode, the magnitude of the transmitted differential motion vector is less than or equal to a preset threshold value. Here, the magnitude of the differential motion vector can be determined using the same method as in step S41 above. The value of the threshold value can also be set to 0 as per step S41 above.

When the application conditions are not satisfied, this processing procedure moves to step S55 and ends the processing. At such time, the predictive signal generation unit 111D outputs the predictive signal generated in step S51 as the final predictive signal.

On the other hand, when all of the application conditions are satisfied, this processing procedure moves to step S53. In step S53, this processing procedure determines, for a block which satisfies the application conditions, whether or not to actually execute the BDOF processing of step S54.

For example, the predictive signal generation unit 111D calculates the sum of absolute differences of the L0 predictive signal and L1 predictive signal, and when the value thereof is less than or equal to a predefined threshold value, determines that BDOF processing will not be performed.

Here, the predictive signal generation unit 111D is also capable of using the results of refinement processing in the determination of whether BDOF is or is not applied, for the blocks for which the refinement processing has been executed by the refinement unit 111C.

For example, the predictive signal generation unit 111D is capable of determining that BDOF should not be applied when, as a result of carrying out refinement processing, the difference between pre- and post-correction motion vectors is less than or equal to the predefined threshold value. When the threshold value is set to "0" for both horizontal and vertical components, this is equivalent to determining that BDOF should not be applied when the motion vector has not changed in comparison to before the correction as a result of the refinement processing.

The predictive signal generation unit 111D is also capable of using the search cost (for example, the sum of absolute differences of the pixel value of the reference block on the L0 side and the pixel value of the reference block on the L1 side) calculated in the course of the foregoing refinement processing to determine whether or not to apply BDOF.

Note that although a case where the sum of absolute differences is used as the search cost is described hereinbelow by way of an example, other indicators can also be used as the search cost. For example, the search cost may be an index value for determining the similarity between image signals, such as the sum of absolute differences of signals after removing local average values, or the sum of squared errors.

For example, in the integer pixel position search in step S43, the predictive signal generation unit 111D is capable of determining that BDOF is not to be applied when the sum of absolute differences of the search points where the foregoing search cost (sum of absolute differences) is minimized is smaller than a predefined threshold value.

The predictive signal generation unit 111D is also capable of determining the suitability of the BDOF processing by combining the method for using the change in motion vectors before and after the foregoing refinement processing with the method for using the search cost of the foregoing refinement processing.

For example, the predictive signal generation unit 111D is capable of determining that BDOF processing is not to be applied when the difference between the motion vectors before and after the refinement processing is less than or equal to a predefined threshold value and when the search cost of the refinement processing is less than or equal to a predefined threshold value.

Here, if the threshold value of the difference between the motion vectors before and after the refinement processing is set to 0, what is determined as the foregoing search cost is the sum of absolute differences of the reference blocks which the motion vector before the refinement processing points to (=the motion vector after the refinement processing).

Furthermore, the predictive signal generation unit 111D may determine the method respectively from the result of the refinement processing for blocks where the refinement processing has been executed, and from the sum of absolute differences for the other blocks.

The predictive signal generation unit 111D can also be configured to determine the suitability of BDOF by using only the information obtained from the results of the refinement processing, without performing the processing of newly calculating the sum of absolute differences of the L0-side predictive signal and the L1-side predictive signal as described earlier. In this case, in step S53, the predictive signal generation unit 111D will determine that BDOF will always be applied to blocks for which the refinement processing has not been executed.

According to this configuration, there is no need, in this case, to perform processing to calculate the sum of absolute differences in the predictive signal generation unit 111D, thus reducing the amount of processing and processing delay in terms of hardware implementation.

In addition, according to this configuration, from the viewpoint of software implementation, it is possible to use the results of the refinement processing to avoid executing BDOF processing in blocks where the effect of BDOF processing is estimated to be inferior, thereby shortening the processing time for the entire image while maintaining coding efficiency.

Furthermore, the determination processing itself, which uses the foregoing refinement processing results, is executed within the refinement unit 111C, and the information indicating the results is transmitted to the predictive signal generation unit 111D, thereby also enabling the suitability of BDOF processing to be determined.

For example, as described above, the values of the motion vectors and the search cost before and after the refinement processing are determined, and a flag is prepared that is set to "1" when the conditions for not applying BDOF are met, and to "0" when the conditions for not applying BDOF are not met and when the refinement processing is not applied, and the predictive signal generation unit 111D is capable of determining the suitability of BDOF by referring to the value of this flag.

Furthermore, for the sake of expediency, step S52 and step S53 are described here as different steps, but it is also possible to make the determinations of step S52 and step S53 simultaneously.

For blocks for which it is determined not to apply BDOF in the determination as described above, this processing procedure moves to step S55. For the other blocks, this processing procedure moves to step S54.

In step S54, the predictive signal generation unit 111D performs the BDOF processing. The BDOF processing itself can be performed using known methods, and therefore the details are not described here. After the BDOF processing is implemented, this processing procedure moves to step S55 to end the processing.

An in-loop filter processing unit 150 according to the present embodiment will be described hereinbelow. FIG. 6 is a diagram illustrating the in-loop filter processing unit 150 according to the present embodiment.

As illustrated in FIG. 6, the in-loop filter processing unit 150 has a target block boundary detection unit 151, an adjacent block boundary detection unit 152, a boundary strength determination unit 153, a filter determination unit 154, and a filter processing unit 155.

Here, the configuration with "A" at the end is a configuration relating to deblocking filter processing for vertical block boundaries, and the configuration with "B" at the end is a configuration relating to deblocking filter processing for horizontal block boundaries.

A case where deblocking filter processing is performed with respect to horizontal block boundaries after deblocking filter processing is performed on vertical block boundaries is provided by way of an example hereinbelow.

The deblocking filter processing may be applied to encoded blocks, applied to predictive blocks, or applied to transformation blocks, as described above. This processing may also be applied to the subblocks obtained by dividing each of the above blocks. In other words, the target block and adjacent blocks may be encoded blocks, predictive blocks, transformation blocks, or subblocks obtained by dividing such blocks.

The definition of subblocks includes the subblocks described as the processing units of the refinement unit 111C and the predictive signal generation unit 111D. When applying a deblocking filter to a subblock, the block in the following description can, where appropriate, be read as a subblock.

Since the deblocking filter processing for vertical block boundaries and the deblocking filter processing for horizontal block boundaries are the same processing, the deblocking filter processing for vertical block boundaries will be described hereinbelow.

The target block boundary detection unit 151A is configured to detect the boundary of the target block on the basis of the control data indicating the block size of the target block.

The adjacent block boundary detection unit 152A is configured to detect the boundaries of adjacent blocks on the basis of the control data indicating the block size of the adjacent blocks.

The boundary strength determination unit 153A is configured to determine the boundary strength of the block boundary between the target block and adjacent blocks.

The boundary strength determination unit 153A may also be configured to determine the boundary strength of the block boundary on the basis of control data indicating whether or not the target block and the adjacent blocks are intra-predictive blocks.

For example, as illustrated in FIG. 7, the boundary strength determination unit 153A may be configured to determine that the boundary strength of the block boundary is "2" when at least one block of the target block and the adjacent blocks is an intra-predictive block (that is, when at least either of the blocks on both sides of the block boundary is an intra-predictive block).

Furthermore, the boundary strength determination unit 153A may be configured to determine the boundary strength of the block boundary on the basis of the control data indicating whether or not the target block and the adjacent blocks contain a non-zero orthogonal transform coefficient and whether or not the block boundary is a transform block boundary.

For example, as illustrated in FIG. 7, the boundary strength determination unit 153A may also be configured to determine that the boundary strength of the block boundary is "1" when at least one block of the target block and the adjacent blocks contains a non-zero orthogonal transform coefficient and when the block boundary is a transform block boundary (that is, there is a non-zero transform coefficient in at least either of the blocks on both sides of the block boundary and the boundary is a TU boundary).

The boundary strength determination unit 153A may also be configured to determine the boundary strength of the block boundary on the basis of the control data indicating whether or not the absolute value of the difference of the motion vectors of the target block and the adjacent blocks is greater than or equal to a threshold value (one pixel, for example).

For example, as illustrated in FIG. 7, the boundary strength determination unit 153A may also be configured to determine that the boundary strength of a block boundary is "1" when the absolute value of the difference in the motion vectors of the target block and the adjacent blocks is greater than or equal to a threshold value (one pixel, for example) (that is, when the absolute value of the difference in the motion vectors of the blocks on both sides of the block boundary is greater than or equal to the threshold value (one pixel, for example).

The boundary strength determination unit 153A may also be configured to determine the boundary strength of the block boundary on the basis of control data indicating whether or not the reference blocks referenced in the prediction of the motion vectors of the target block and the adjacent blocks are different.

For example, as shown in FIG. 7, the boundary strength determination unit 153A may be configured to determine that the boundary strength of the block boundary is "1" when the reference blocks referenced in the prediction of the motion vectors of the target block and the adjacent blocks are different (that is, when the reference images of the blocks on both sides of the block boundary are different).

The boundary strength determination unit 153A may be configured to determine the boundary strength of the block boundary on the basis of control data indicating whether or not the numbers of motion vectors of the target block and the adjacent blocks are different.

For example, as shown in FIG. 7, the boundary strength determination unit 153A may be configured to determine that the boundary strength of the block boundary is “1” when the numbers of motion vectors of the target block and the adjacent blocks are different (that is, when the number of motion vectors is different in the blocks on both sides of the block boundary).

The boundary strength determination unit 153A may also be configured to determine the boundary strength of the block boundary on the basis of whether or not the refinement processing by the refinement unit 111C has been applied to the target block and the adjacent blocks.

For example, as shown in FIG. 7, the boundary strength determination unit 153A may be configured to determine that the boundary strength of the block boundary is “1” when the target block and the adjacent blocks are all blocks to which the refinement processing has been applied by the refinement unit 111C.

Here, the boundary strength determination unit 153A may determine that the “refinement processing has been applied” based on the fact that all the predetermined conditions in step S41 of FIG. 4 are satisfied for the relevant block. Furthermore, a flag indicating the result of the determination in step S41 of FIG. 4 may be prepared, and the boundary strength determination unit 153A may be configured to determine whether or not the refinement processing is applied depending on the value of the flag.

The boundary strength determination unit 153A may also be configured to determine that the boundary strength of the block boundary is “1” when the target block and/or the adjacent blocks are blocks to which the refinement processing by the refinement unit 111C has been applied.

Alternatively, the boundary strength determination unit 153A may be configured to determine that the boundary strength of the block boundary is “1” when the boundary is a subblock boundary in the refinement processing by the refinement unit 111C.

Furthermore, the boundary strength determination unit 153A may be configured to determine that the boundary strength of the block boundary is “1” when DMVR is applied to at least either of the blocks on both sides of the block boundary.

For example, as shown in FIG. 7, the boundary strength determination unit 153A may be configured to determine that the boundary strength of the block boundary is “0” when none of the above-mentioned conditions are satisfied.

Note that the larger the value of the boundary strength, the greater the likelihood of block distortion occurring at the block boundary.

The foregoing boundary strength determination method may be determined using a common method for luminance signals and color difference signals, or using some different conditions. For example, the foregoing refinement processing-related conditions may be applied to both luminance signals and color-difference signals, or only to luminance signals or only to color-difference signals.

A flag that controls whether or not the result of the refinement processing is considered when determining the boundary strength may also be provided in the header referred to as SPS (Sequence Parameter Set) or PPS (Picture Parameter Set).

The filter determination unit 154A is configured to determine the type of filter processing (for example, deblocking filter processing) to be applied to block boundaries.

For example, the filter determination unit 154A may be configured to determine whether or not to apply filter processing to a block boundary, and which filter processing (weak filter processing or strong filter processing) to apply to the block boundary, on the basis of the boundary strength of the block boundary, quantization parameters contained in the target block and adjacent blocks, and the like.

The filter determination unit 154A may be configured to determine that no filter processing is to be applied when the boundary strength of a block boundary is “0”.

The filter processing unit 155A is configured to perform processing on the pre-deblocking image on the basis of the determination by the filter determination unit 154A. The processing performed on the pre-deblocking image can be: no filter processing, weak filter processing, or strong filter processing, or the like.

Figure 8:
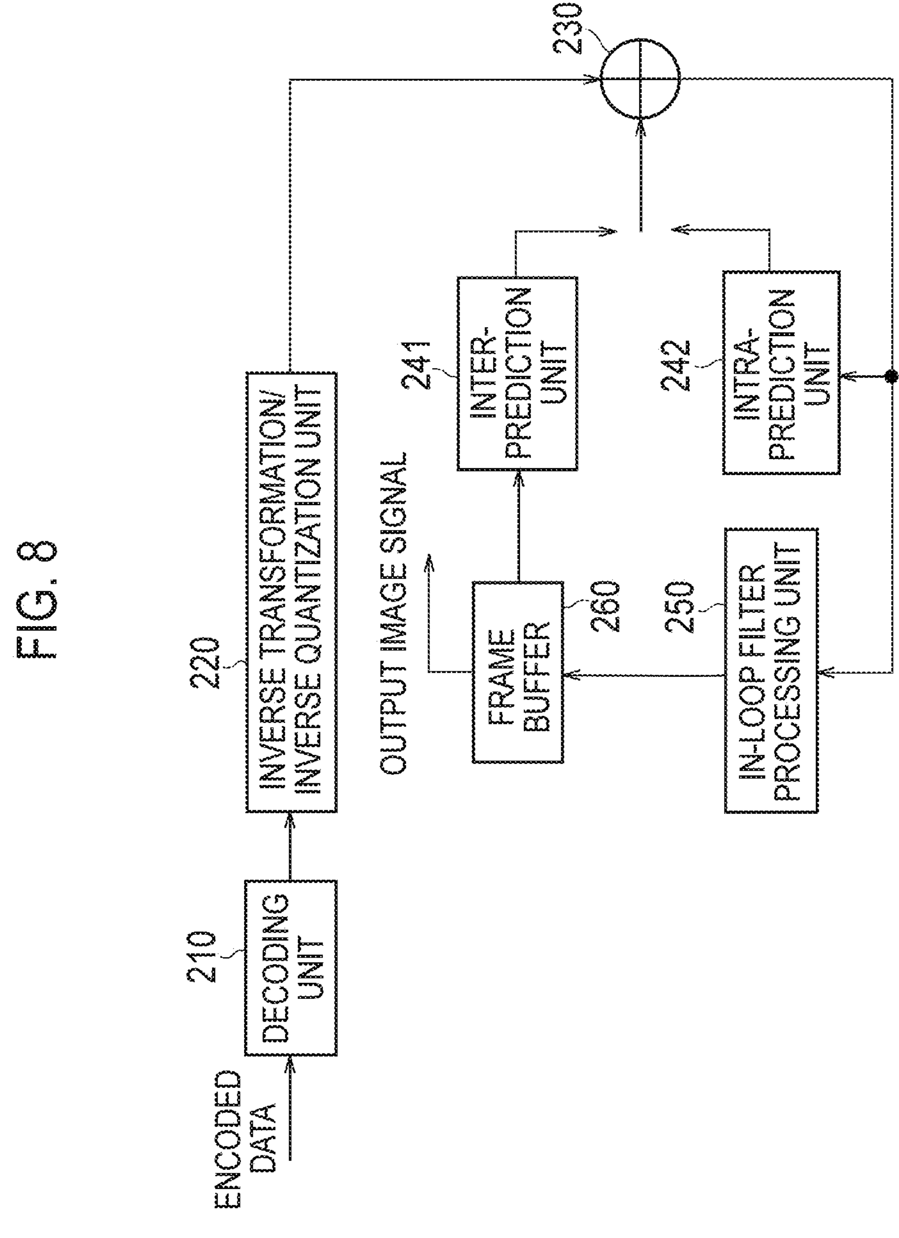
FIG. 8 is a diagram illustrating an example of function blocks of an image decoding device 200 according to one embodiment.

An image decoding device 200 according to the present embodiment is described hereinbelow with reference to FIG. 8. FIG. 8 is a diagram illustrating an example of function blocks of the image decoding device 200 according to the present embodiment.

As illustrated in FIG. 8, the image decoding device 200 includes a decoding unit 210, an inverse transformation/inverse quantization unit 220, an adder 230, an inter-prediction unit 241, an intra-prediction unit 242, an in-loop filter processing unit 250, and a frame buffer 260.

The decoding unit 210 is configured to decode the encoded data generated by the image encoding device 100 and decode coefficient level values.

Here, for example, the decoding is entropy decoding using steps which are the inverse of the entropy encoding performed by the encoding unit 140.

The decoding unit 210 may also be configured to acquire control data through the processing to decode the encoded data.

Note that, as mentioned earlier, the control data may contain size data such as the encoded block size, the predictive block size, and the transformation block size.

The inverse transformation/inverse quantization unit 220 is configured to perform inverse transformation processing of the coefficient level values outputted from the decoding unit 210. Here, the inverse transformation/inverse quantization unit 220 may also be configured to perform inverse quantization of the coefficient level values prior to inverse transformation processing.

Here, the inverse transformation processing and inverse quantization are performed using steps which are the inverse of the transformation processing and quantization performed by the transformation/quantization unit 131.

The adder 230 is configured to generate a pre-filtering decoding signal by adding the predictive signal to the predictive residual signal which is outputted from the inverse transformation/inverse quantization unit 220, and to output this pre-filtering decoding signal to the intra-prediction unit 242 and the in-loop filter processing unit 250.

Here, the pre-filtering decoding signal constitutes the reference block used by the intra-prediction unit 242.

Like the inter-prediction unit 111, the inter-prediction unit 241 is configured to generate a predictive signal by means of inter-prediction (prediction between frames).

More specifically, the inter-prediction unit 241 is configured to generate a predictive signal for each predictive block, on the basis of a reference signal that is contained in the motion vector decoded from the encoded data and the reference frame. The inter-prediction unit 241 is configured to output predictive signals to the adder 230.

Like the intra-prediction unit 112, the intra-prediction unit 242 is configured to generate a predictive signal by means of intra-prediction (prediction within a frame).

More specifically, the intra-prediction unit 242 is configured to specify a reference block that is contained in a target frame and to generate, on the basis of the specified reference block, a predictive signal for each predictive block. The intra-prediction unit 242 is configured to output predictive signals to the adder 230.

Like the in-loop filter processing unit 150, the in-loop filter processing unit 250 is configured to perform filter processing on a pre-filtering decoding signal which is outputted from the adder 230 and to output a post-filtering decoding signal to the frame buffer 260.

Here, for example, the filter processing is deblocking filter processing that reduces distortions that occur at the boundaries of blocks (encoded blocks, predictive blocks, transformation blocks, or subblocks obtained by dividing such blocks).

Like the frame buffer 160, the frame buffer 260 is configured to store a reference frame which is used by the inter-prediction unit 241.

Here, the post-filtering decoding signal constitutes the reference frame used by the inter-prediction unit 241.

Figure 9:
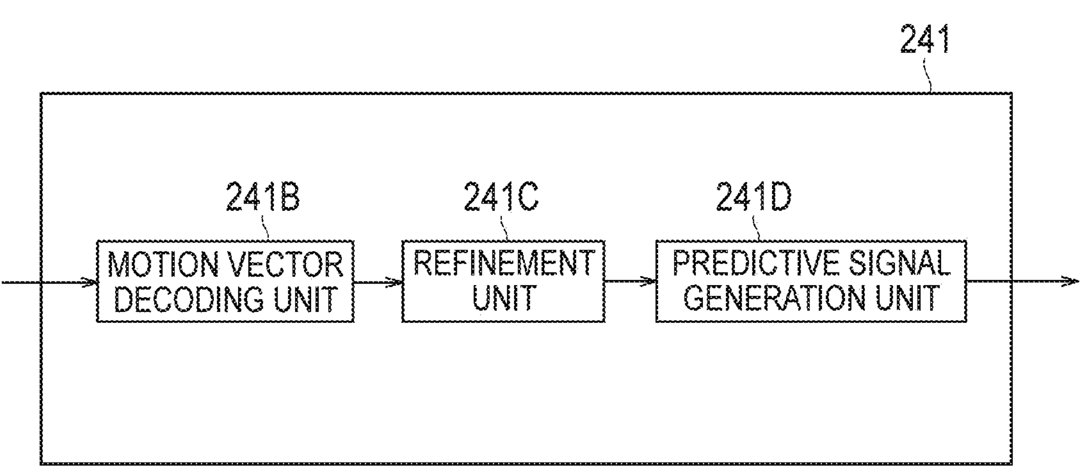
FIG. 9 is a diagram illustrating an example of function blocks of an inter-prediction unit 241 of the image decoding device 200 according to one embodiment.

The inter-prediction unit 241 according to the present embodiment is described hereinbelow with reference to FIG. 9. FIG. 9 is a diagram illustrating an example of function blocks of the inter-prediction unit 241 according to the present embodiment.

As illustrated in FIG. 9, the inter-prediction unit 241 has a motion vector decoding unit 241B, a refinement unit 241C, and a predictive signal generation unit 241D.

The inter-prediction unit 241 is an example of a prediction unit that is configured to generate, on the basis of a motion vector, a predictive signal which is contained in a predictive block.

The motion vector decoding unit 241B is configured to acquire motion vectors by decoding the control data received from the image encoding device 100.

Like the refinement unit 111C, the refinement unit 241C is configured to execute refinement processing to correct the motion vectors.

Like the predictive signal generation unit 111D, the predictive signal generation unit 241D is configured to generate a predictive signal on the basis of a motion vector.

The in-loop filter processing unit 250 according to the present embodiment will be described hereinbelow. FIG. 10 is a diagram illustrating the in-loop filter processing unit 250 according to the present embodiment.

As illustrated in FIG. 10, the in-loop filter processing unit 250 has a target block boundary detection unit 251, an adjacent block boundary detection unit 252, a boundary strength determination unit 253, a filter determination unit 254, and a filter processing unit 255.

Here, the configuration with "A" at the end is a configuration relating to deblocking filter processing for vertical block boundaries, and the configuration with "B" at the end is a configuration relating to deblocking filter processing for horizontal block boundaries.

Here, a case where deblocking filter processing is performed on horizontal block boundaries after deblocking filter processing is performed on vertical block boundaries is provided by way of an example.

The deblocking filter processing may be applied to encoded blocks, applied to predictive blocks, or applied to transformation blocks, as described above. This processing may also be applied to the foregoing subblocks obtained by dividing each of the above blocks. In other words, the target block and adjacent blocks may be encoded blocks, predictive blocks, transformation blocks, or subblocks obtained by dividing such blocks.

Since the deblocking filter processing for vertical block boundaries and the deblocking filter processing for horizontal block boundaries are the same processing, the deblocking filter processing for vertical block boundaries will be described hereinbelow.

Like the target block boundary detection unit 151A, the target block boundary detection unit 251A is configured to detect the boundary of the target block on the basis of the control data indicating the block size of the target block.

Like the adjacent block boundary detection unit 152A, the adjacent block boundary detection unit 252A is configured to detect the boundaries of adjacent blocks on the basis of the control data indicating the block sizes of the adjacent blocks.

Like the boundary strength determination unit 153A, the boundary strength determination unit 253A is configured to determine the boundary strength of the block boundary between the target block and adjacent blocks. The method for determining the boundary strength of a block boundary is as described above.

The filter determination unit 254A is configured to determine the type of deblocking filter processing to be applied to a block boundary in the same way as the filter determination unit 154A. The method for determining the type of deblocking filter processing is as described above.

Like the filter processing unit 155A, the filter processing unit 255A is configured to perform processing on the pre-deblocking image on the basis of the determination by the filter determination unit 254A. The processing performed on the pre-deblocking image can be: no filter processing, weak filter processing, or strong filter processing, or the like.

According to the image encoding device 100 and the image decoding device 200 of the present embodiment, when the boundary strength is determined by the boundary strength determination units 153 and 253, consideration is given to whether or not the refinement processing by the refinement units 111C and 241C has been applied to the blocks adjacent to the boundary.

For example, when the refinement processing is applied to at least one block of the two blocks adjacent to the relevant boundary, the boundary strength of the boundary is set to 1, as mentioned earlier.

For boundaries with a boundary strength equal to or greater than "1", the filter determination units 154 and 254 determine whether or not a deblocking filter is applied to the block boundary and the type of deblocking filter, by taking into account parameters such as the quantization parameters.

With this configuration, even when the values of post-refinement motion vectors cannot be used to determine boundary strength due to hardware implementation limitations, a deblocking filter can be applied appropriately to the boundaries of blocks where the refinement processing has been performed, thereby suppressing block noise, and making it possible to improve subjective image quality.

Various methods have been proposed for determining the suitability of deblocking filters and for determining the boundary strength. For example, Patent Literature 1 discloses a technique for omitting the application of a deblocking filter on the basis of information about the syntax, such as whether the relevant block is in skip mode. Furthermore, Patent Literature 2, for example, discloses a technique to omit the application of a deblocking filter by using quantization parameters.

However, the suitability of the refinement processing is not considered by either of said patent literature. One of the problems to be solved by the present invention is a problem that pertains to refinement processing, in which the value of a motion vector decoded from syntax is corrected on the decoding side: when the corrected motion vector value cannot be used to determine application of the deblocking filter, the application cannot be determined properly.

Therefore, the methods of Patent Literature 1 and Patent Literature 2, which do not take into account the suitability of the refinement processing, cannot solve this problem. On the other hand, it is possible to combine the methods of Patent Literature 1 and Patent Literature 2 with the determination to apply the deblocking filter of the present invention.

According to the image encoding device 100 and the image decoding device 200 of the present embodiment, as a condition for executing the refinement processing in the refinement units 111C and 241C, consideration is given to whether or not the motion vectors used as the basis for the processing are encoded in symmetric MVD mode.

In this refinement processing, when a search is made only for a point at which the absolute values of the differential motion vectors on the L0 and L1 sides are the same and where the code is inverted, it is possible to obtain the same motion vector as in the case of transmitting a motion vector in symmetric MVD mode.

Therefore, when the originally transmitted motion vectors are obtained through the foregoing refinement processing, the amount of code related to the differential motion vectors can be reduced by making the differential motion vectors transmitted in symmetric MVD mode as small as possible.

In particular, when the encoding method is such that only the flag is transmitted when the differential motion vector has a specific value (such as 0), and the differential value is encoded directly in the case of other values, even if the difference in the motion vector to be corrected in such refinement processing is small, the effect of reducing the encoding amount will likely be large.

In addition, by setting the condition for executing the foregoing refinement processing as the condition that the reference motion vector for the refinement processing is encoded in symmetric MVD mode and that the value of the differential motion vector is less than or equal to a predefined threshold value, it is possible to implicitly switch whether or not to execute the refinement processing depending on the value of the differential motion vector.

Similarly, by using the condition that the motion vector of the relevant block is coded in symmetric MVD mode and the value of the differential motion vector is less than or equal to a predefined threshold value as a condition for applying BDOF processing in the predictive signal generation units 111D and 241D, it is possible to implicitly switch whether or not to apply BDOF processing depending on the value of the differential motion vector.

According to the image encoding device 100 and the image decoding device 200 of the present embodiment, the results of the refinement processing are taken into account in determining whether or not to execute the BDOF processing in the predictive signal generation units 111D and 241D. In CE9-related: BDOF buffer reduction and enabling VPDU based application, JVET-M0890, the determination is made using the absolute difference of the predictive signals of L0 and L1; however, by making the determination based on the results of the refinement processing instead, the processing to calculate the absolute difference can be reduced.

The foregoing image encoding device 100 and the image decoding device 200 may also be realized by a program that causes a computer to perform each function (each process).

Note that, in each of the foregoing embodiments, the present invention has been described by taking application to the image encoding device 100 and the image decoding device 200 by way of an example; however, the present invention is not limited only to such devices and can be similarly applied to encoding/decoding systems provided with each of the functions of an encoding device and a decoding device.

According to the present invention, even when post-refinement motion vectors cannot be used to determine the application of a deblocking filter, a deblocking filter can be applied appropriately to the boundaries of blocks where the refinement processing has been performed, thereby suppressing block noise, and making it possible to improve subjective image quality.

What is claimed is:

1. An image decoding device, comprising:

a motion vector decoding unit that decodes a motion vector from encoded data;

a refinement unit that performs refinement processing to correct the decoded motion vector, wherein the refinement processing comprises:

performing a search with integer pixel precision using a search image generated from information of the motion vector;

determining a corrected motion vector at integer pixel interval positions through the search; and performing a motion vector search using non-integer pixel precision, and a predictive signal generation unit that generates a predictive signal on the basis of the corrected motion vector outputted from the refinement unit, wherein the predictive signal generation unit determines whether or not to perform BDOF processing for each sub-block to which the refinement processing is to be performed, on the basis of information calculated in the course of the refinement processing, the sub-block is generated by splitting a block, the predictive signal generation unit determines, for each of the sub-blocks, that the BDOF processing is not to be performed when a minimum search cost of the refinement processing is less than or equal to a predefined threshold value, the predictive signal generation unit provides a decoded image, the refinement unit performs the refinement processing for each sub-block, and each of the horizontal size of the sub-block and the vertical size of the sub-block is less than or equal to 16 pixels.

2. An image decoding method, comprising the steps of:

(A) decoding a motion vector from encoded data;

(B) performing refinement processing to correct the decoded motion vector, wherein the refinement processing comprises:

performing a search with integer pixel precision using a search image generated from information of the motion vector;

determining a corrected motion vector at integer pixel interval positions through the search; and performing a motion vector search using non-integer pixel precision, and (C) generating a predictive signal on the basis of the corrected motion vector outputted from the refinement unit, wherein it is determined in the step (C), for each sub-block to which the refinement processing is to be performed, whether or not to perform BDOF processing, on the basis of information calculated in the course of the refinement processing, the sub-block is generated by splitting a block, it is determined in the step (C), for each sub-block, that the BDOF processing is not to be performed when a minimum search cost of the refinement processing is less than or equal to a predefined threshold value, the predictive signal is a decoded image, in the step (B), the refinement processing is performed for each sub-block, and each of the horizontal size of the sub-block and the vertical size of the sub-block is less than or equal to 16 pixels.

3. A non-transitory computer readable medium having stored thereon instructions comprising executable code, which when executed by at least one processor, cause a computer to execute the steps of:

(A) decoding a motion vector from encoded data;

(B) performing refinement processing to correct the decoded motion vector, wherein the refinement processing comprises:

performing a search with integer pixel precision using a search image generated from information of the motion vector;

determining a corrected motion vector at integer pixel interval positions through the search; and performing a motion vector search using non-integer pixel precision, and (C) generating a predictive signal on the basis of the corrected motion vector outputted from the refinement unit, wherein it is determined in step (C), for each sub-block to which the refinement processing is to be performed, whether or not to perform BDOF processing, on the basis of information calculated in the course of the refinement processing, the sub-block is generated by splitting a block, it is determined in the step (C), for each sub-block, that the BDOF processing is not to be performed when a minimum search cost of the refinement processing is less than or equal to a predefined threshold value, the predictive signal is a decoded image, the refinement unit performs the refinement processing for each sub-block, and each of the horizontal size of the sub-block and the vertical size of the sub-block is less than or equal to 16 pixels.

* * * * *